Patented Apr. 13, 1926.

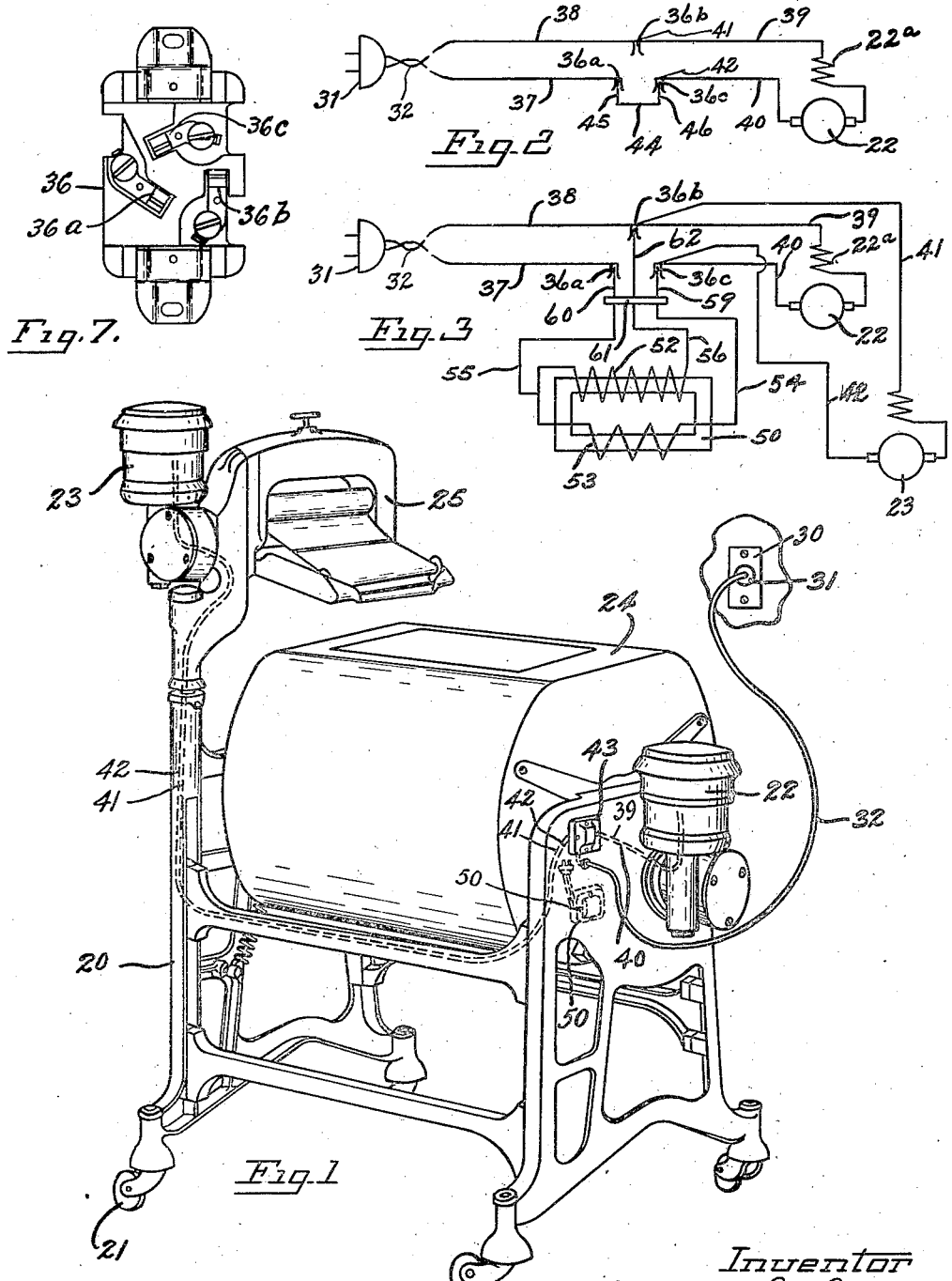

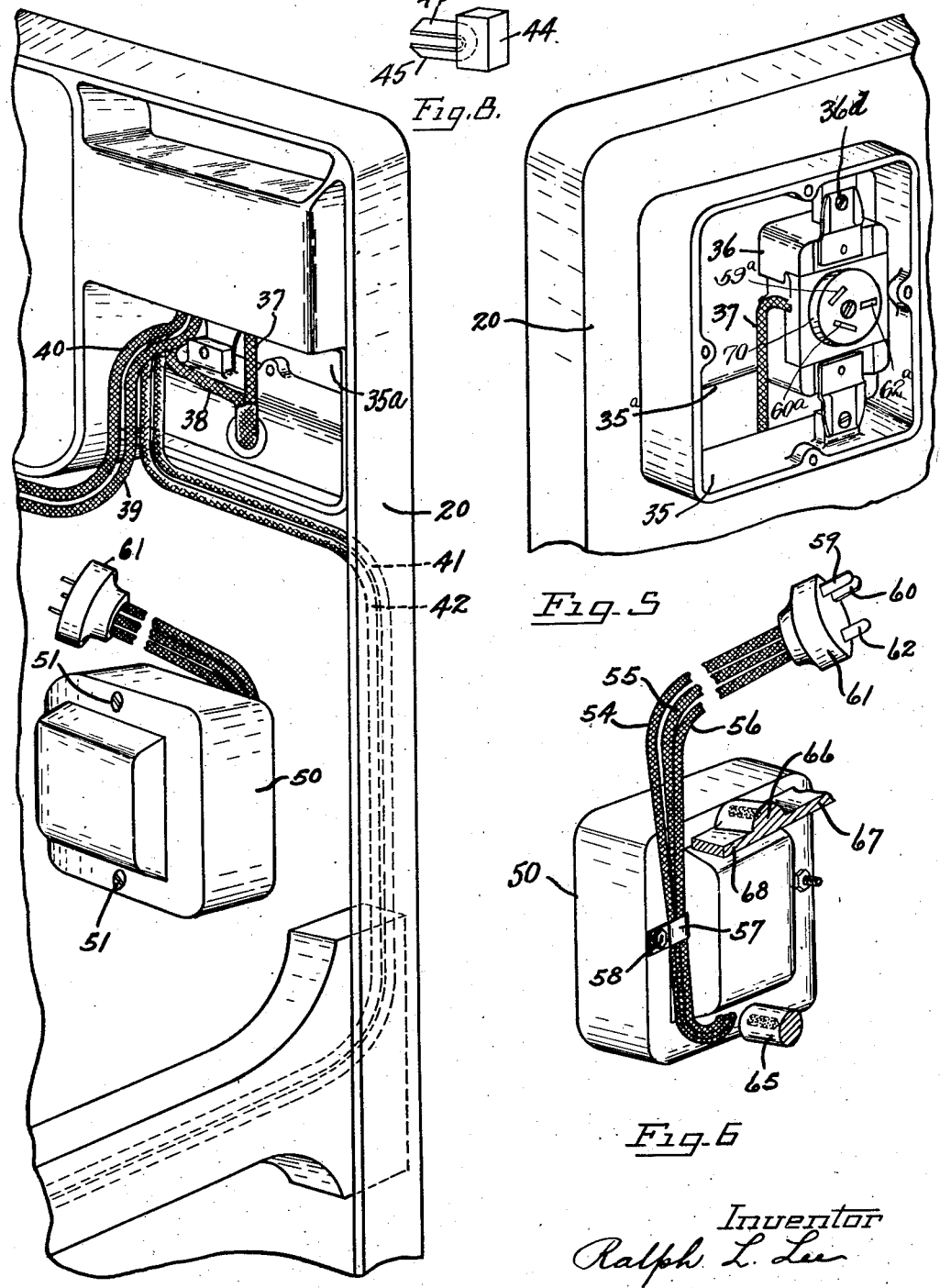

1,580,506

UNITED STATES PATENT OFFICE.

RALPH L. LEE, OF DAYTON, OHIO, ASSIGNOR TO DELCO-LIGHT COMPANY, OF DAYTON, OHIO, A CORPORATION OF DELAWARE.

ELECTRICAL APPARATUS.

Application filed December 31, 1923. Serial No. 683,541.

*To all whom it may concern:*

Be it known that I, RALPH L. LEE, a citizen of the United States of America, residing at Dayton, county of Montgomery, State of Ohio, have invented certain new and useful Improvements in Electrical Apparatus, of which the following is a full, clear, and exact description.

This invention relates to a system of electrical distribution and control for one or more power translating devices, which are mounted on a work machine.

One object of the invention is to impress upon said devices a voltage different from that of the supply line voltage when desired.

In order to accomplish this object, one embodiment of the invention includes a work machine supporting a plurality of electric motors which are connected with a source of current. These motors are normally adapted for operation on line voltages within a predetermined range. However, to permit operation of said motors when the line voltages are outside the predetermined range, a transformer, movable with the work machine frame, is provided, and a receptacle, also movable with the frame, is included in the motor circuit, whereby the transformer may be connected with the motor circuit. The connection of the transformer with the motor circuit will cause a voltage different from the line voltage to be impressed upon the motors. The transformer may be used to either step up or step down the voltage as desired. Means are provided on the frame for preventing mounting of the transformer thereon except when the transformer is in a predetermined position.

Further objects and advantages of the present invention will be apparent from the following description, reference being had to the accompanying drawings, wherein a preferred embodiment of one form of the present invention is clearly shown.

In the drawings:

Fig. 1 is a perspective view of a power driven washing machine embodying the present invention.

Fig. 2 is a diagrammatic view of the electrical circuits and connections when the motors are operating under normal voltage conditions.

Fig. 3 is a diagrammatic view of the electrical circuits and connections with the transformers connected in the motor circuit.

Fig. 4 is a fragmentary perspective view of one side of a work machine frame, showing the transformer and receptacle mounted on the frame and the wires for connecting the receptacle and motors with the source of current.

Fig. 5 is a fragmentary perspective view of the other side of the frame, showing the receptacle mounted thereon.

Fig. 6 is a perspective view of the transformer, showing in fragmentary section the means on the frame for preventing mounting of the transformer thereon except when the transformer is in a predetermined position.

Fig. 7 is a front view of the receptacle with a portion thereof removed to show the clip for receiving the contacts of a plug.

Fig. 8 is a perspective view of a jumper plug.

Referring to the drawings, and more particularly to Fig. 1, a washing machine frame 20 which is movable on casters 21 supports motors 22 and 23 for driving a washing tub 24 and a wringer 25 respectively. A receptacle 30, attached to a wall is adapted to receive a wall plug 31 attached to a flexible two wire cord 32. Receptacle 30 is connected with a suitable source of current (not shown). Frame 20 is provided with a housing or terminal box 35 which receives a receptacle 36 secured to the frame 20 by screws $36^d$. Receptacle 36 is provided with clip contacts $36^a$, $36^b$, and $36^c$. Plug 31 is connected with contacts $36^a$ and $36^b$ by wires 37 and 38 of cord 32, respectively, and motors 22 and 23 are connected with contacts $36^b$ and $36^c$ by wires 39, 40 and 41, 42, respectively, which wires are supported by the frame 20. A cover 43 is provided for housing 35, and upon removal of said cover, the receptacle 36 is made accessible. A jumper plug 44 is provided with connected contacts 45 and 46 which are adapted to be received by contacts $36^a$ and $36^c$ respectively for completing the circuit of motor 22 which is as follows: plug 31, wire 38, contact $36^b$, wire 39, motor field $22^a$, motor armature, wire 40, contact $36^c$, jumper plug 44, contact $36^a$, wire 37 and plug 31. The motor 23 is in parallel with motor 22, as shown in Fig. 3. Plug 44 is used, as above described when the line voltage is within a predetermined range on which the motors 22 and 23 are normally capable of operation.

For permitting operation of motors 22 and 23 under voltage conditions which are outside the predetermined range, a transformer 50 is provided for impressing upon said motors a voltage which is different from the line voltage. This transformer is mounted on the frame 20 by screws 51, and comprises a primary winding 52 and a secondary winding 53. Lead 54 is connected with one end of secondary winding 53 and lead 55 is connected with one end of the primary and the other end of secondary windings 52 and 53 respectively. Lead 56 is connected with the other end of winding 52. These leads emerge from the transformer 50 adjacent one edge thereof, and are held in an upright position by a clamp 57 which is secured to the transformer by a nut 58. The opposite ends of leads 54 and 55 are connected with contact fingers 59 and 60 respectively of a connection plug 61, and the opposite end of lead 56 is connected with contact finger 62 of said plug. Frame 20 is provided with lugs 65 and 66 with which the mounting screws 51 engage to secure the transformer 50 to the frame 20. Lug 66 is provided with oppositely extending arms 67 and 68, and it is apparent that it would be impossible to mount the transformer 50 on frame 20 in any positions except that shown in Figs. 4 and 6, because, if it were endeavored to attach the transformer 50 in an inverted position, the leads 54, 55, and 56 would be engaged by the arms of lug 66 and thereby prevent attachment of the transformer 50 to the frame 20. Mounting of the transformer 50 in the position shown, allows any moisture which might get into the leads 54, 55, and 56 to drop off rather than follow the leads into the transformer.

Upon the occurrence of voltage conditions outside the predetermined range, the jumper plug 44 is removed from the receptacle 36. The plug 61 is then inserted into the housing 35 through an opening 35ª, located in the back of said housing. The plug 61 can then be attached to receptacle 36 from the front of frame 20, contact fingers 59, 60 and 62 passing through guide slots 59ª, 60ª and 62ª, respectively, formed in insulating member 70 of receptacle 36, which slots are in alignment with contact clips 36ᶜ, 36ª and 36ᵇ. When the plug 61 is inserted into receptacle 36, contact fingers 59 and 60 engage contacts 36ᶜ and 36ª respectively, and finger 62 engages contact 36ᵇ. The transformer 50 may have its primary and secondary windings connected with leads 54, 55, and 56 in such manner as either to step up or step down the line voltage as may be desired, but in the diagrammatic Fig. 3, the connections are for a condition requiring the line voltage to be stepped up. The primary circuit will be from the source of current through plug 31, wire 37, contact 36ª, contact finger 60, lead 55, primary winding 52, lead 56, contact finger 62, contact 36ᵇ, wire 38 and plug 31. The current flowing through the primary winding 52 will cause an induced current to flow through the secondary winding 53, lead 54, contact finger 59, contact 36ᶜ, wire 40, motor 22, wire 39, and contact 36ᵇ. Thus a voltage different than the line voltage will be impressed upon the motors 22 and 23 and cause the same to operate at a voltage which is within the range of voltages under which the motor was designed to operate.

It is advantageous to mount the transformer upon the work machine frame so that only one flexible connection between the machine and a wall receptacle is required. By virtue of this invention motors of the same design can be used in different regions when the conditions of voltage variation are different. For example, if a washing machine is used in a territory where the line voltage is about 110 volts, and is practically constant, the transformer is not supplied. But, in regions where the voltage is generally below 110 volts or frequently subject to substantial decrease, the transformer can be supplied and used when necessary.

The receptacle 36 not only provides for the jumper or transformer connections, but also serves as a terminal block for joining the wires leading to the motors and to the supply line.

While the form of embodiment of the invention as herein disclosed, constitutes a preferred form, it is to be understood that other forms might be adopted, all coming within the scope of the claims which follow.

What is claimed is as follows:

1. A system of current distribution comprising, in combination, a current consuming device, an electrical circuit for said device including a receptacle having a plurality of terminals, a conductor member arranged to be received by said receptacle and to cooperate with certain of said terminals for connecting the device directly with the electrical circuit, a transformer, and a second conductor member connected with the transformer and arranged to be received by the receptacle after the first conductor member is removed for connecting said second conductor member with certain terminals whereby to connect the consuming device with the electrical circuit through said transformer.

2. A system for current distribution comprising, in combination, a current consuming device, a receptacle having three terminals, one of said terminals being connected with one side of the device, the second of said terminals being connected with the other side of the device and with one side of a source of current supply, the third terminal being connected with the other side of the source of current supply, a conductor member adapted to bridge the first and said third terminals for connecting the device directly with the source of current, a transformer, and a second conductor member connected with the transformer and arranged to cooperate with said terminals after the first conductor member is removed whereby to connect the consuming device with the source of current through said transformer.

3. A system of current distribution comprising, in combination, a current consuming device, a receptacle having three terminals, one of said terminals being connected with one side of the device, the second of said terminals being connected with the other side of the device and with one side of a source of current supply, the third terminal being connected with the other side of the source of current supply, a conductor member adapted to bridge the first and said third terminals for connecting the device directly with the source of current, a transformer having primary and secondary windings, a second conductor member having three terminals, one of said latter terminals being connected with one side of each winding, the other of said latter terminals being connected respectively with the other side of said windings, said latter terminals being arranged to cooperate with the terminals of said receptacle after the first conductor member is removed to connect the primary winding in parallel with the consuming device and to connect the secondary winding in series with the device.

4. A system of current distribution comprising, in combination, a current consuming device, a frame for supporting the device and having an opening, a terminal box on the front of said frame, a transformer carried on the back of the frame and having connections adapted to be extended through said opening, and terminals within said box and accessible from the front of the frame for connecting the consuming device and transformer with a source of current supply.

5. A system of current distribution comprising, in combination, a current consuming device, a frame for supporting the device, a terminal box on the front of said frame and having an opening providing access to the interior thereof from the front of the frame, said frame having an opening in the back of the box, a transformer carried on the back of the frame and having connections adapted to be extended through said opening, terminals within said box and accessible from the front of the frame for connecting the consuming device and transformer with a source of current supply, and a cover for the front of said box.

In testimony whereof I hereto affix my signature.

RALPH L. LEE.